United States Patent [19]

Lindstrom et al.

[11] Patent Number: 4,710,068
[45] Date of Patent: Dec. 1, 1987

[54] AIR CONVEYOR

[75] Inventors: Donald E. Lindstrom, Lakewood; David T. Setzer, Long Beach, both of Calif.

[73] Assignee: Reynolds Metals Company, Richmond, Va.

[21] Appl. No.: 907,443

[22] Filed: Sep. 15, 1986

[51] Int. Cl.⁴ .............................................. B65G 53/16
[52] U.S. Cl. ..................................... 406/88; 406/93; 406/31
[58] Field of Search ................... 406/88, 86, 89, 93, 406/10, 11, 19, 31, 72

[56] References Cited

U.S. PATENT DOCUMENTS

| | | | |
|---|---|---|---|
| Re. 29,645 | 5/1978 | Kaminski | 113/7 A |
| T966,009 | 1/1978 | Gardineer, Jr. et al. | 302/2 R |
| 1,342,531 | 6/1920 | Conlon | 406/95 X |
| 2,805,898 | 9/1957 | Willis, Jr. | 406/88 |
| 3,105,720 | 10/1963 | Barker | 406/88 |
| 3,210,124 | 10/1965 | Niemi et al. | 406/88 |
| 3,477,764 | 11/1969 | Smith | 406/88 |
| 3,580,640 | 5/1971 | Eriksson | 302/2 R |
| 3,588,176 | 6/1971 | Byrne | 302/2 |
| 3,610,696 | 10/1971 | Fulton | 406/88 X |
| 3,684,327 | 8/1972 | Hurd | 406/88 X |
| 3,685,632 | 8/1972 | Brady | 406/88 |
| 3,748,177 | 7/1973 | Neumann et al. | 134/30 |
| 3,751,297 | 8/1973 | Minbiole, Jr. et al. | 134/30 |
| 3,759,579 | 9/1973 | Johnston | 406/88 |
| 3,774,972 | 11/1973 | Grapengiesser et al. | 302/29 |
| 3,874,740 | 4/1975 | Hurd | 406/88 X |
| 3,945,505 | 3/1976 | Frisbie et al. | 406/72 X |
| 3,947,236 | 3/1976 | Lasch, Jr. | 432/11 |
| 3,953,076 | 4/1976 | Hurd | 302/2 R |
| 3,975,057 | 8/1976 | Hurd | 406/88 X |
| 3,999,806 | 12/1976 | Hurd | 406/88 X |
| 4,004,349 | 1/1977 | Neumann | 406/92 X |
| 4,049,225 | 9/1977 | Stange et al. | 406/72 X |
| 4,144,021 | 3/1979 | Neumann | 432/58 |
| 4,182,586 | 1/1980 | Lenhart | 406/87 |
| 4,253,783 | 3/1981 | Lenhart | 406/86 |
| 4,347,022 | 8/1982 | Lenhart | 406/88 |
| 4,369,005 | 1/1983 | Lenhart | 406/88 |
| 4,371,309 | 2/1983 | Principe et al. | 414/676 |
| 4,378,182 | 3/1983 | Futer | 406/88 X |
| 4,395,165 | 7/1983 | De Robertis et al. | 406/88 |
| 4,451,182 | 5/1984 | Lenhart | 406/86 |
| 4,456,406 | 6/1984 | Lenhart | 406/88 |
| 4,462,720 | 7/1984 | Lenhart | 406/84 |
| 4,500,229 | 2/1985 | Cole et al. | 406/88 |
| 4,521,130 | 6/1985 | Lenhart | 406/86 |
| 4,561,806 | 12/1985 | Lenhart | 406/88 |
| 4,568,223 | 2/1986 | Lenhart | 406/88 |

Primary Examiner—Joseph F. Peters, Jr.
Assistant Examiner—James M. Kannofsky
Attorney, Agent, or Firm—Alan T. McDonald

[57] ABSTRACT

An air conveying mechanism for transporting articles along a conveying surface is disclosed. The conveying surface includes a plurality of air jets in fluid flow relation with a plenum. An air accelerator hood is provided adjacent the entry point of the articles onto the conveyor to permit initial high speed acceleration of the articles along the conveying surface.

9 Claims, 3 Drawing Figures

U.S. Patent    Dec. 1, 1987    Sheet 1 of 1    4,710,068
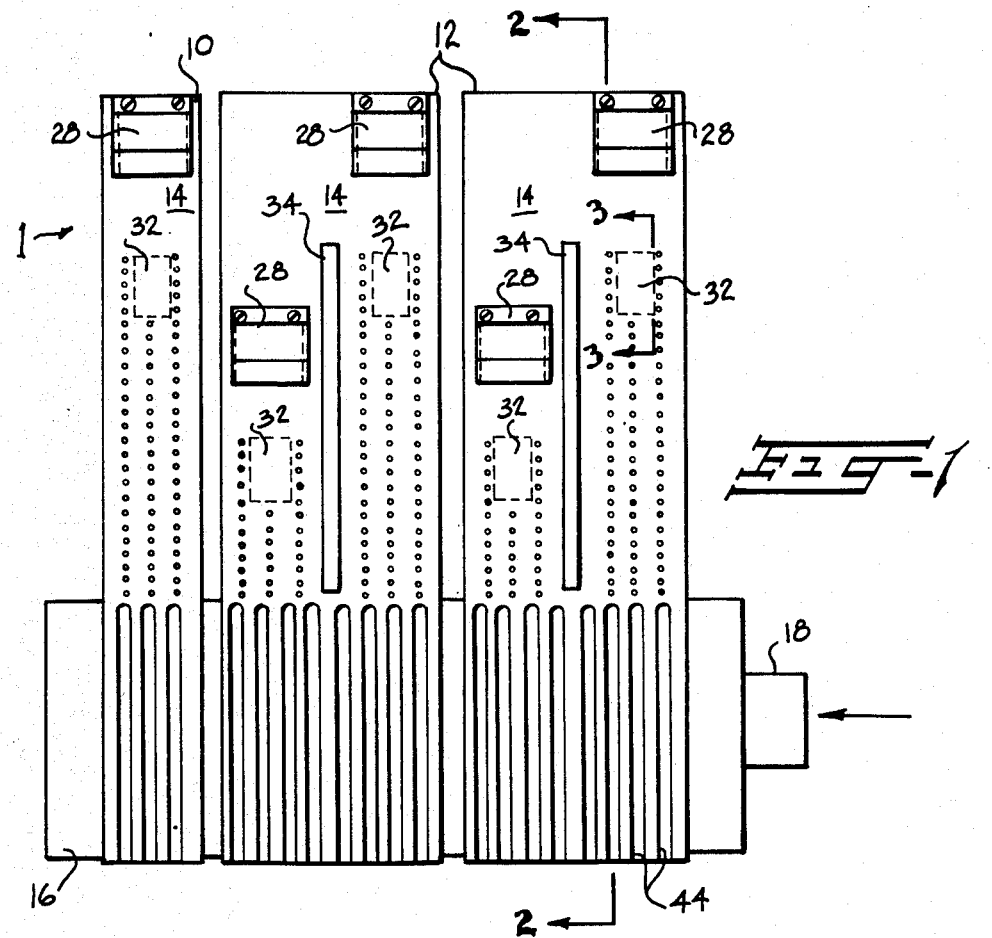
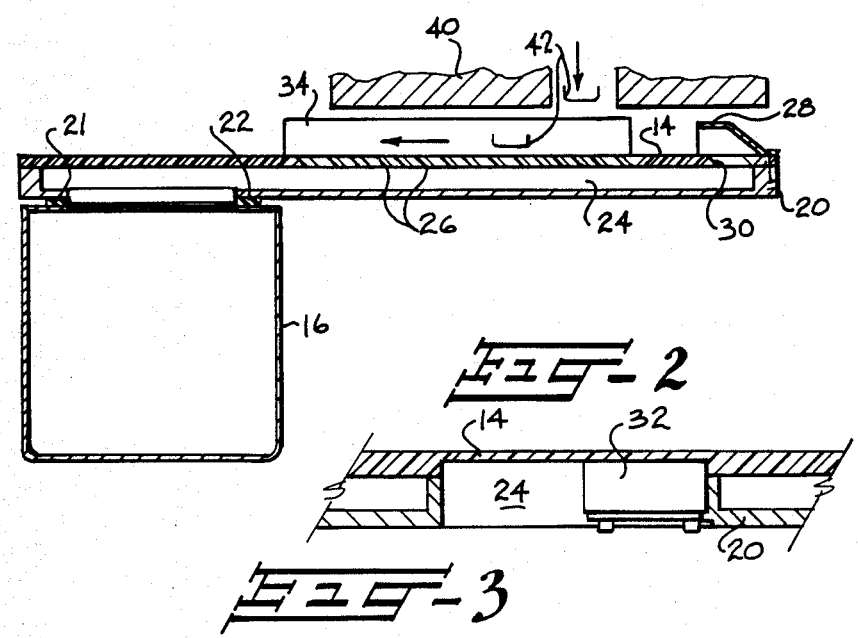

AIR CONVEYOR

BACKGROUND OF THE INVENTION

In forming metallic cups from which can bodies are eventually produced by the draw and iron process, the cups are formed in a cupping press at high speed and ejected vertically downwardly onto a conveying surface at an entry point of the conveying surface. Due to the high speed nature of these cupping presses, it is imperative that a cup be removed from the entry point of the conveyor quickly so that the next succeeding cup does not come into contact with the previous cup, resulting in a jam of the conveying system and necessitating shutdown of the press for clearing.

Traditionally, the conveying mechanisms positioned beneath cupping presses have been endless belt conveyors having a driven pulley, an idler pulley, an endless belt positioned around the pulleys and a driving mechanism. Such conveying mechanisms require frequent adjustment for proper tension of the belt, include numerous moving parts subject to failure and rely solely upon friction between the belt and the object being conveyed to affect high speed removal from the entry point of the conveying surface.

Unfortunately, slippage of the objects on the belt often results in an object not fully clearing the entry point of the conveyor prior to a subsequent object being dropped thereon, resulting in a jam of the system.

In order to overcome the slippage problems of frictional conveyors, it has been proposed to supplement the friction-induced acceleration with an initial acceleration provided by an air jet. Such a solution has not been successful, as the acceleration provided by the air jet along the frictional surface often results in tipping or other inconsistent movement of the objects along the conveyor, resulting in jamming of the conveyor system.

It is thus a primary object of the present invention to provide a conveying mechanism which does not rely upon friction between the object being conveyed and the conveying surface for conveyance of the object It is also an object of the present invention to eliminate the belt conveyors commonly employed with cupping presses in order that their adjustment and maintenance requirements be eliminated It is also a primary objective of the present invention to provide a conveying mechanism in which positive initial acceleration from the entry point of the objects on the conveying surface is provided along a frictionless conveying surface.

It is also common in the can making art, as well as in other fields, to employ air tables, or air conveyors, to move can bodies throughout the can making plant. While such air tables do provide movement for such objects, it is heretofore been unknown to employ air tables in a setting where high speed initial acceleration of the objects was required.

It is thus an additional primary objective of the present invention to provide an air conveying system which includes initial high speed acceleration of the objects along the conveying surface.

An additional limitation of the known belt conveyors, especially for those employed for conveying metallic cups from cupping presses, is the ability of such systems to properly sense cups at their entry point to the conveyor. There is limited space beneath a cupping press and belt conveyors do not permit sensors to be positioned beneath the conveying surface. Thus, metal sensors must be located above the conveying surface and behind the entry point. Unfortunately, in this position, the sensor sees only a portion of the cylindrical sidewall of the cup. This presents two conflicting problems. If the sensor is set to always see the cup, and if the cup is not removed from the entry point quickly enough, the sensor gives a false jam signal, resulting in shutdown of a properly operating system. However, if false jam signals are not desired, then the sensor must be set such that it will not always see cups entering the system, resulting in a false "no cup" signal, again resulting in shutdown of a properly operating system.

It is thus an additional object of the present invention to provide a conveying system in which the metal sensor is positioned to see a relatively large, flat metallic surface, thus improving the sensing reliability of the system.

THE PRESENT INVENTION

By means of the present invention, these desired objects have been obtained. The present invention comprises an air conveying mechanism for objects, including cups which are to be formed into can bodies, which includes a conveying surface having a plurality of air jets therein in fluid flow relation with an air plenum and an air accelerator hood in fluid flow relationship with the air plenum positioned adjacent the entry point of the objects onto the conveying surface for providing initial high speed acceleration of the objects from their entry point on the conveying surface Such a conveying system has no moving parts, requires no adjustment in use and, due to the positive acceleration of the objects, reduces substantially the chances of jamming occurring from a failure of an object to exit the entry position of the conveying system prior to the entry of the next object onto the conveying surface. Further, when access is required, the convyor system of the present invention may easily be slid from its operating position, without time consuming detachment, allowing quick repair of any jams that might occur and allowing easy servicing, when necessary.

BRIEF DESCRIPTION OF THE DRAWINGS

The conveying system of the present invention will be more fully described with reference to the FIGURES in which:

FIG. 1 is a top elevational view of a multi-lane conveying system according to the present invention;

FIG. 2 is a cross-sectional view along line 2—2 of FIG. 1 illustrating the conveying system of the present invention; and FIG. 3 is a partial cross-sectional view along line 3—3 of FIG. 1 illustrating the entry position of the conveying system.

DETAILED DESCRIPTION OF THE PREFERRED EMBODIMENT

Turning now to the FIGURES, a multi-lane conveying system 1 comprising the present invention is disclosed. Conveying surface 14 may be formed as a single lane 10 or may be formed as a duel lane 12. Of course, conveying surface 14 may also be formed with multiple lanes, each identical to lanes 10 or 12. The conveying surface 14 is formed from a plastics resin material, such as high molecular weight polyethylene or the like, and is mounted upon table base 20 to form an air table having an air plenum 24 therein. The air plenum 24 is in fluid flow relation with an air duct 16 by means of mounting member 21 and seal 22. This mounting permits the conveying surface 14 and base 20 to be easily lifted from duct 16 and removed from its operating position, should a jam occur or servicing be required, without a need for complex detachment of mechanical components. Air duct 16 receives air through entranceway 18 from an air blower (not shown). Along the conveying surface 14, a plurality of air jets 26 are positioned in fluid flow relation with plenum 24, such that the air jets move articles along the conveying surface 14 in the direction of the air jets 26, i.e., the air jets provide thrust to the articles along a path defined by the air jets 26.

In addition to the air jets 26, an accelerator hood 28 is positioned adjacent the entry point for the articles onto conveying surface 14 and in fluid flow relation with the air plenum 24. As a cup 42 (or other article) is ejected downwardly, as from a cupping press 40, the cup arrives at an entry point above sensor 32 on conveying surface 14. Sensor 32 senses the presence of cup 42, as well as the subsequent removal of cup 42 from sensor 32 and the arrival of a subsequent cup 42. Should sensor 32 see cup 42 for a time period in excess of that normally encountered, sensor 32 shuts down cupping press 40, anticipating a jam. Similarly, should sensor 32 not see cup 42 when expected, sensor 32 shuts down cupping press 40, anticipating a problem within press 40. Since sensor 32 is positioned directly beneath the entry point of the cups 42, the sensor 32 sees the entire flat bottom surfaces of the cups 42, improving substantially the reliability of the sensor, both in always seeing cups that are present and is not falsely reporting the presence of cups that are not present, thus reducing substantially the occasions of shutdown of a properly operating system.

As cup 42 reaches conveying surface 14 above sensor 32, accelerator hood 28 turns air from plenum 20 in a generally horizontal direction against cup 42, quickly accelerating cup 42 past sensor 32 so that the entrance position above sensor 32 of conveying surface 14 is free to accept a subsequent cup 42. As the cup 42 travels along conveying surface 14, air jets 26 maintain the initial movement of cup 42 for a substantial difference. The cup 42 rides on a cushion of air above conveying surface 14. This is shown in an exagerated manner in FIG. 2. In actuality, cup 42 rides a fraction of an inch over conveying surface 14. At the exit end of conveying surface 14, air jets 26 are replaced by slots 44 which provide a low friction conveying surface to the end of conveying surface 14.

Dual lane conveying surfaces 12 include spacers 34 to help maintain cups 42 within their proper lanes. Single lane conveyor 10 requires no such separator.

In order that sufficient acceleration be provided by hood 28, it is preferred that duct 16 receive air at a rate of at least about 200 standard cubic feet per minute at about 4 to 8 inches of water pressure per lane attached to duct 16. This rate, of course, will vary depending upon the object being moved.

While the conveying system has been described with respect to the movement of metallic cups, it is clear that the conveying system is suitable for far more general use. Thus, for example, the system could be employed where objects are to be turned from one conveyor to another at a 90° angle at entry point 32, as well as for initial conveying of objects entering conveying surface 14 from a vertical drop.

While the conveying mechanism of the present invention has been described with reference to certain specific embodiments thereof, it is not intended to be so limited thereby, except as set forth in the accompanying claims.

We claim:

1. A conveying system for objects comprising a conveying surface along which said objects are conveyed, an air plenum positioned beneath said conveying surface, said air plenum being in fluid flow connection with said conveying surface through a plurality of air jets within said conveying surface to provide an air cushion between said conveying surface and an end surface of said objects, an air duct in fluid flow connection with said air plenum and with a source of air, an acceleration hood in fluid flow connection with said air plenum, said acceleration hood being positioned above said conveying surface and behind an entry point for said objects to be conveyed along said conveying surface, and means for providing said objects to said conveying surface at said entry point and in front of said acceleration hood, said acceleration hood being constructed and arrannged to produce a stream of airflow generally parallel and along to said conveying surfce and against a side surface of said objects such that said acceleration hood provides initial acceleration of said objects along said conveying surface as they arrive at said conveying surface.

2. The conveying system of claim 1 further comprising a sensor for said objects positioned beneath said entry point of said conveying surface.

3. The conveying system of claim 1 wherein multiple air plenums are in fluid flow connection with said air duct and wherein each air plenum is in fluid flow connetion with a conveying surface and an aceleration hood.

4. The conveying system of claim 1 wherein multiple conveying surfaces and multiple acceleration hoods are in fluid flow connection with said air duct.

5. The conveying system of claim 1 wherein multiple air plenums are in fluid flow connection with siad air duct and multiple conveying surfaces and acceleration hoods are in fluid flow connection with said air plenums.

6. The conveying system of claim 1 wherein said air duct is suppled air at at least about 200 standard cubic foot per minute at about 4 to 8 inches of water presence.

7. The conveying system of claim 3 wherein said air duct is supplied air at at least about 200 standard cubic feet per minute at about 4 to 8 inches of water pressure per conveying surface.

8. The conveying system of claim 4 wherein said air duct is supplied air at at least about 200 standard cubic feet per minute at about 4 to 8 inches of water pressure per conveying surface.

9. The conveying system of claim 5 wherein said air duct is supplied air at at least about 200 standard cubic feet per minute at about 4 to 8 inches of water pressure per conveying surface.

* * * * *